United States Patent
Tanno et al.

[19]

[11] Patent Number: 6,064,772
[45] Date of Patent: *May 16, 2000

[54] IMAGE REPRODUCING APPARATUS AND IMAGE REPRODUCING METHOD

[75] Inventors: Takemi Tanno, Yokosuka; Kazuhiko Haruma, Tokyo, both of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/456,941

[22] Filed: Jun. 1, 1995

[30] Foreign Application Priority Data

Jun. 14, 1994 [JP] Japan ................................ 6-131687

[51] Int. Cl.⁷ ........................................................ G06K 9/36
[52] U.S. Cl. ................................................ 382/236; 348/401
[58] Field of Search .................................. 382/166, 246, 382/250, 232, 234, 236, 245, 247; 364/514 R; 348/396, 401, 388, 423

[56] References Cited

U.S. PATENT DOCUMENTS

| | | | |
|---|---|---|---|
| 4,977,454 | 12/1990 | Tsinberg | 348/389 |
| 4,992,857 | 2/1991 | Williams | 348/388 |
| 5,027,193 | 6/1991 | Kani et al. | 348/388 |
| 5,055,927 | 10/1991 | Keesen et al. | 348/389 |
| 5,115,309 | 5/1992 | Hang | 348/388 |
| 5,148,271 | 9/1992 | Kato et al. | 348/390 |
| 5,182,642 | 1/1993 | Gersdorff et al. | 348/388 |
| 5,231,384 | 7/1993 | Kuriacose | 348/388 |
| 5,353,065 | 10/1994 | Katsumata et al. | 348/389 |
| 5,490,247 | 2/1996 | Tung et al. | 395/162 |
| 5,502,493 | 3/1996 | Meyer | 348/426 |
| 5,502,494 | 3/1996 | Auld | 348/426 |
| 5,512,896 | 4/1996 | Read et al. | 341/65 |
| 5,515,296 | 5/1996 | Agarwal | 364/514 R |
| 5,517,581 | 5/1996 | Johnston et al. | 382/232 |
| 5,526,051 | 6/1996 | Gove et al. | 348/388 |
| 5,532,940 | 7/1996 | Agarwal et al. | 364/514 R |
| 5,535,290 | 7/1996 | Allen | 382/250 |
| 5,572,236 | 11/1996 | Feig et al. | 382/250 |
| 5,577,190 | 11/1996 | Peters | 395/501 |

*Primary Examiner*—Jon Chang
*Assistant Examiner*—Jayanti K. Patel
*Attorney, Agent, or Firm*—Fitzpatrick, Cella, Harper & Scinto

[57] ABSTRACT

An image reproducing apparatus has a detection circuit for detecting a component difference between groups of encoded image data, a decode circuit for decoding the image data, a regulation circuit for regulating a component of the image data, and a control circuit for controlling the regulation circuit on the basis of a result of detection made by the detection circuit.

8 Claims, 15 Drawing Sheets

| FIG. 11A | FIG. 11B |

FIG. 14

| | | | | | | | |
|---|---|---|---|---|---|---|---|
| 1ch | I | B | B | P | B | B | P | |
| 2ch | | I | B | B | P | B | B | P |

| | | | | | | | |
|---|---|---|---|---|---|---|---|
| 1ch (WHEN DISPLAYED) | I | B | B | P | B | B | P |

FIG. 15

| | | | | | | | |
|---|---|---|---|---|---|---|---|
| 1ch | I | B | B | P | B | B | P |
| 2ch | I | B | B | P | B | B | P |

| | | | | | | | |
|---|---|---|---|---|---|---|---|
| 2ch (WHEN DECODED) | I | B | B | P | B | B | P | |
| 1ch (WHEN DISPLAYED) | | I | B | B | P | B | B | P |

IMAGE REPRODUCING APPARATUS AND IMAGE REPRODUCING METHOD

BACKGROUND OF THE INVENTION

1. Field of the Invention

This invention relates to an image reproducing apparatus and an image reproducing method and, more particularly, to an apparatus and a method in which groups of compressed image data in a plurality of channels are decoded in synchronization with each other.

2. Description of the Related Art

The Motion Picture Image Coding Exert Group (MPEG) method and the Joint Photographic Coding Exert Group (JPEG) method are known as recent high-efficiency image coding methods.

Coding systems based on these methods basically utilize discrete cosine transform (DCT), adaptive quantization and variable length coding (VLC) to transmit data by encoding the data with respect to a plurality of frequency components.

With the recent development of multimedia communication, a need has arisen of simultaneously decoding a plurality of kinds of encoded image data in a plurality of channels, for example, in order to simultaneously display or print images from the image data on one display screen.

In such a case, when one image is synthesized from groups of encoded image data in a plurality of channels as described above, there is a possibility of large variations in brightness and hue with respect to the channels, so that the resulting synthesized image is unnatural.

SUMMARY OF THE INVENTION

In view of the above-described problem, an object of the present invention is to provide an image reproducing apparatus and an image reproducing method free from the above-described problem when groups of encoded data in a plurality of channels are simultaneously decoded.

To achieve this object, according to one aspect of the present invention, there is provided an image reproducing apparatus comprising detection means for detecting a component difference between groups of encoded image data, decode means for decoding the image data, regulation means for regulating a component of the image data, and control means for controlling the regulation means on the basis of a result of detection made by the detection means.

According to another aspect of the present invention, there is provided a decoder comprising decode means for decoding encoded data with a predetermined decoding parameter, means for setting the decoding parameter, changing means for changing the decoding parameter on the basis of encoded data other than the encoded data.

These and other object and features of the present invention will become apparent from the following detailed description of the preferred embodiment of the invention with reference to the accompanying drawing;

BRIEF DESCRIPTION OF THE DRAWINGS

FIG. 14 is a diagram of timing control; and

FIG. 15 is a diagram of timing control.

DESCRIPTION OF THE PREFERRED EMBODIMENT

The preferred embodiment of the present invention will be described below with reference to the accompanying drawings.

Figure 1:
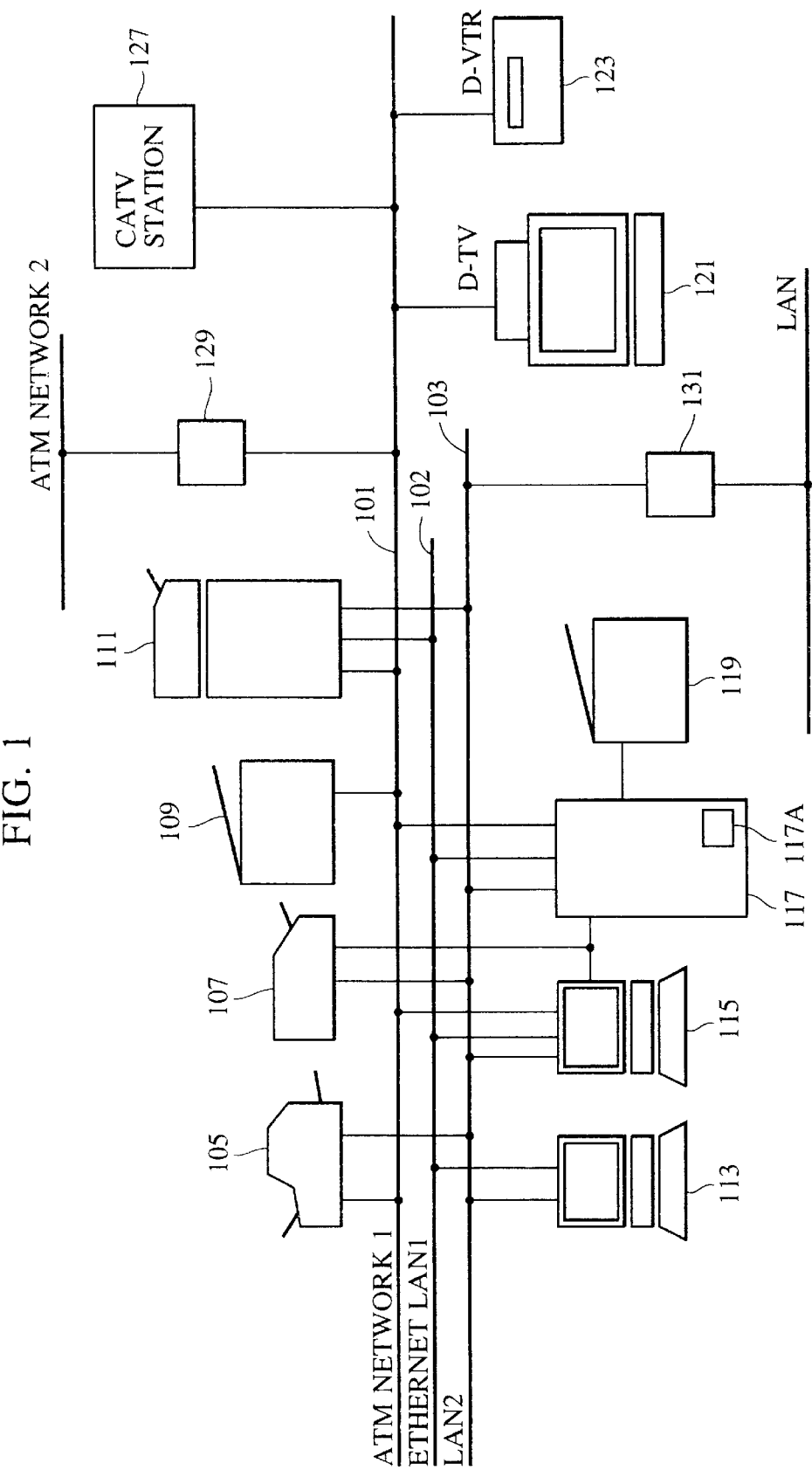
FIG. 1 is a diagram of a system which represents an embodiment of the present invention.

FIG. 1 is a block diagram showing the entire system of the embodiment of the present invention.

A line 101 in FIG. 1 represents an asynchronous transfer mode (ATM) network in which various kinds of encoded data which are encoded by coding systems such as those in accordance with the JPEG and MPEG methods are transferred in the ATM. A line 102 represents a local area network (LAN) 1 in which data is transferred in a mode other than the ATM, and a line 103 represents a LAN 2 in conformity with the IEEE 1394 standard. A symbol 105 represents a facsimile apparatus connected to the ATM network and having functions of compressing and expanding image data. A symbol 107 represents a color printer having an internal page memory and having a function of forming an image on the basis of image data obtained by expanding received compressed data.

A symbol 109 represents a color copying machine including a color reader and a color printer. The color copying machine 109 also includes a compression circuit for compressing image data of an original read with the color reader based on, for example, the JPEG method, a page memory in which compressed image data is written, and an expansion circuit for reading out compressed image data written in the page memory and for expanding the read image data before the read data is supplied to the printer.

A symbol 111 represents a file server for temporarily storing image data input through the ATM network. A symbol 113 represents a work station for inputting data to the file server 111 and for outputting data from the file server 111. A symbol 115 represents a personal computer connected to the ATM network. The personal computer 115 exchanges MPEG or JPEG data with the above-mentioned local area network, encodes data, decodes data, edits various kinds of image data, and performs other various kinds of processing.

The personal computer 115 is also connected to the printer 107 and other units through the network circuit 103 or a special circuit.

A symbol 117 represents a file server having the same construction as the file server 111.

A color copying machine 119 similar to the above-mentioned color copying machine 109 is connected to the file server 117.

The file server 117 has a memory 117A storing information on the encoding/decoding method or ability of other terminals (105 to 123) connected in the network, information on various kinds of processing ability, operating conditions, use record information and other various kinds of collateral information. For example, such information is used to enable an optimal one of the terminals to be selected by the operation of the personal computer 115, or to enable appropriation of a codec of other terminals at the time of encoding or decoding.

Such kinds of information is always updated by communication of the file server 117 with each terminal by a predetermined timing (when a new terminal is connected) and in a predetermined cycle (every data at a determined time).

A symbol 121 represents a digital television set connected to the ATM network. The digital television set 121 receives data which is encoded by the MPEG or JPEG method and which is input through the ATM network. The digital television set 121 decodes this data and displays the decoded data on a CRT display.

This monitor may be a display unit using a ferroelectric liquid crystal.

A symbol 123 represents a video tape recorder (VTR) which receives MPEG or JPEG compressed image data input through the ATM network.

The VTR 123 directly records MPEG or JPEG compressed image data input through the ATM network on a tape, or records this data on a tape after changing this data by a predetermined signal processing.

The VTR 123 has an image data compressor for compressing non-compressed data received from an external unit based on the MPEG or JPEG method before the data is recorded on a tape.

A symbol 127 represents a cable television (CATV) station which sends out data compressed by the MPEG or JPEG compressed image data method.

The CATV station 127 outputs broadcast data through the ATM network as illustrated.

A symbol 129 represents a router for connecting another ATM network to this ATM network.

A symbol 131 represents a router for connection to another local area network.

ATM network switches (not shown) are provided between the facsimile apparatus 105 and the printer 107 and between the color copying machine 111 and the ATM network.

JPEG Data

JPEG data in various kinds of data transmitted in the above-described network will next be described.

Figure 2:
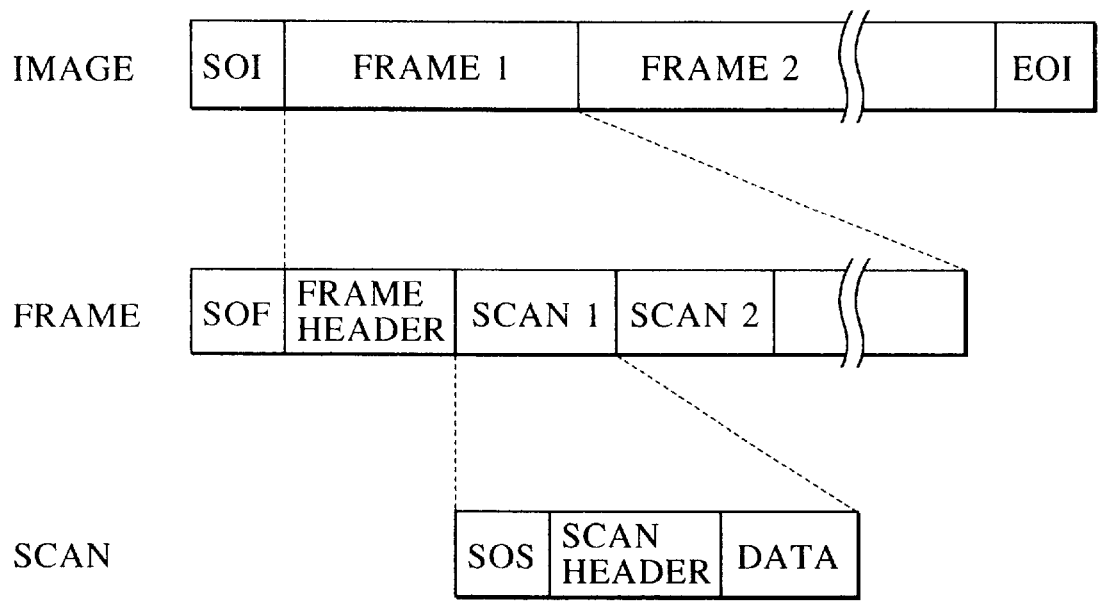
FIG. 2 is a diagram of the data structure in accordance with the JPEG method.

JPEG data is encoded by the CCITT/ISO JPEG method that is an international standard method for reducing data bit of still multi-color images by utilizing frequency characteristics of the data and human visual characteristics,. JPEG data has encoded data portions and various marker codes arranged in an image/frame/scan hierarchical structure such as shown in FIG. 2.

That is, this JPEG data has a start-of-image (SOI) code, a frame section, and an end-of-image (EOI) code. The frame section is formed of a plurality of frames with respect to hierarchies if the JPEG data is hierarchically-encoded data, or of a single frame if the JPEG data is not hierarchically-encoded data.

Each frame has a start-of-frame (SOF) code, a frame header and a scan section which is formed by a start-of-scan (SOS) code, a scan header and encoded data.

The scan section is formed of a plurality of scans if it is encoded by separating brightness data (Y) and two groups of color-difference data (Cr, Cb) from each other or (in the case of non-interleaving is performed), or of a single scan if it is encoded without separating such data (in the case of interleaving).

Figure 3:
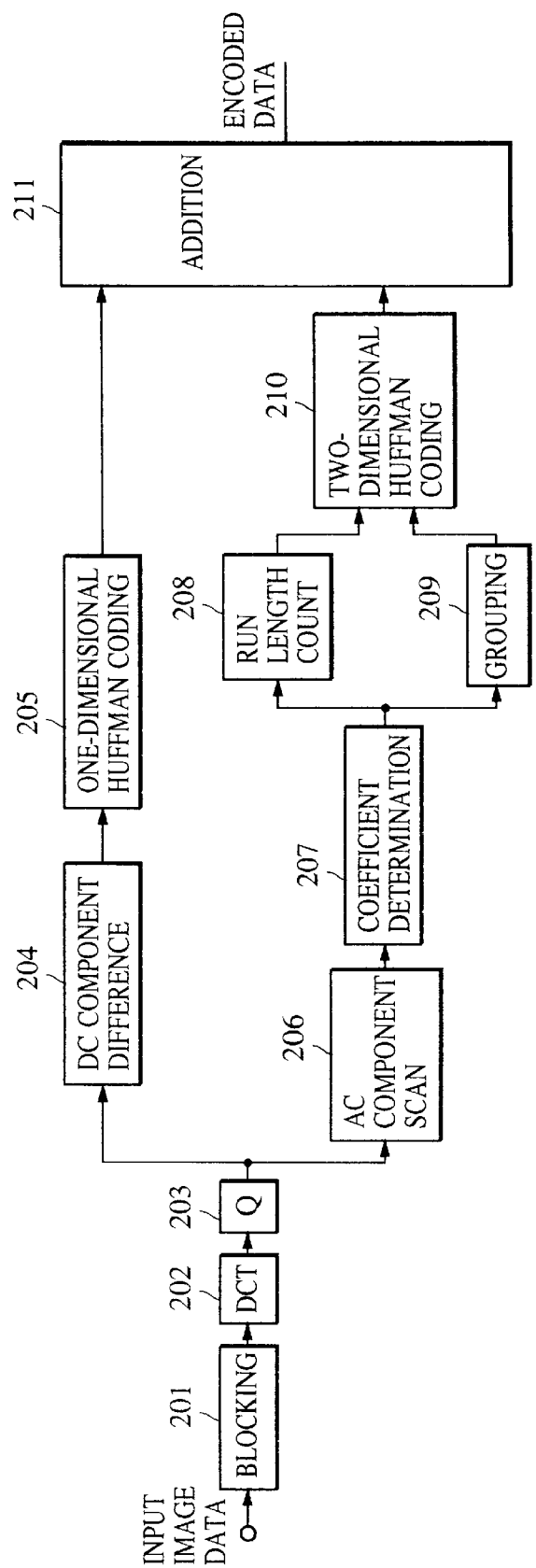
FIG. 3 is a diagram of a coder in accordance with the JPEG method.
Figure 4:
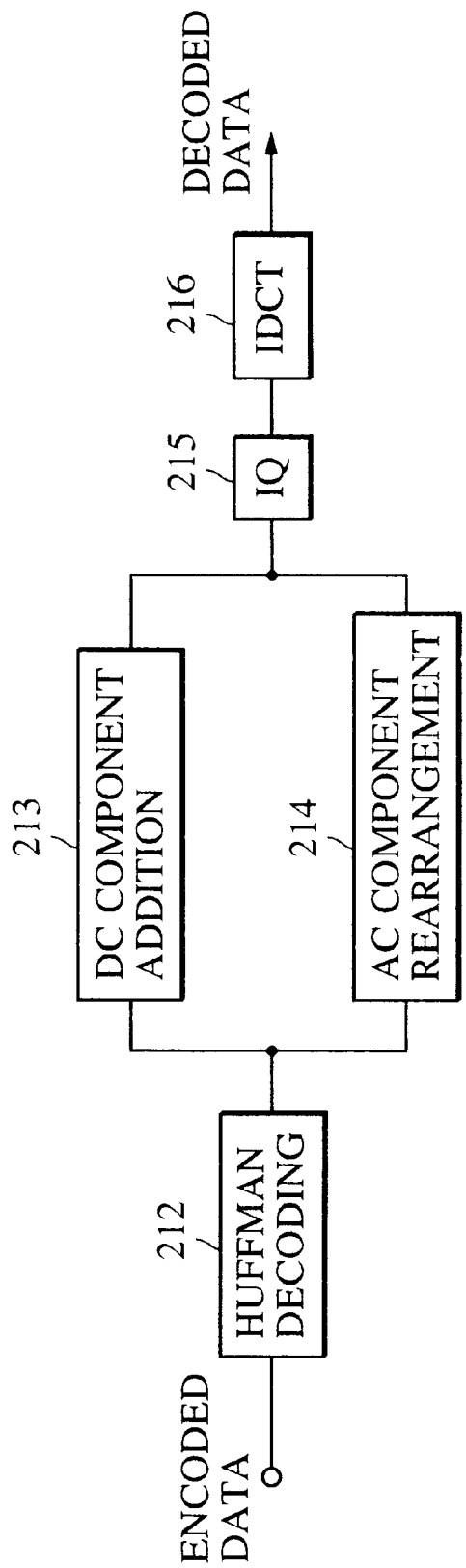
FIG. 4 is a diagram of a decoder in accordance with the JPEG method.

Algorithms for encoding and decoding in the basic base line system of the JPEG method will next be described with reference to FIGS. 3 and 4.

First, input image data is divided into blocks of 8×8 pixels by a blocking circuit 201. Then, each of the divided blocks undergoes two-dimensional discrete cosine transform (DCT) by a DCT circuit 202, thereby being converted into horizontal and vertical spatial frequency components (DCT coefficients) consisting of one direct current (DC) component and 63 alternating current (AC) components.

Each of the frequency components thus obtained is quantized by being divided with a predetermined coefficient (quantization coefficient) by a quantizer 203 and is thereafter encoded by corresponding one of algorithms differing from each other with respect to DC and AC components.

For the above-mentioned quantization, coefficients differing with respect to frequency components are ordinarily used and a quantization coefficient for a low frequency component important in terms of visual sensation is set so as to be smaller than a quantization coefficient for a high frequency component, whereby high-frequency components comparatively unimportant are cut so that the total amount of data is reduced.

The correlation between the above-mentioned DC components of adjacent blocks is high. To obtain encoded data of the DC component of one block, therefore, a difference between the DC components of this block and the preceding adjacent block is obtained by a difference circuit 204, the obtained difference value is encoded by a Huffman coder 205 in a one-dimensional Huffman coding manner.

On the other hand, the above-mentioned 63 AC components are zigzag-scanned from a lower frequency component important in terms of visual sensation by a scanning circuit 206 to be converted into a non-dimensional array, and determination is made by a determiner 207 as to whether the value of each component is a "zero value" or any value other than the zero value (effective coefficient).

With respect to "zero value", zero run is counted by a counter 208. Effective coefficients are grouped by a grouping circuit 209 according to their values. On the basis of combinations of run lengths and grouped values thereby obtained, two-dimensional Huffman coding is performed by a Huffman coder 210, thus obtaining encoded data of the AC components.

In codes of the above-described Huffman coding, a shorter code length is allotted to one having a higher generation probability (the above-mentioned difference value with respect to the DC component and the combination of run lengths and effective coefficients with respect to the AC components), thereby reducing the total amount of data.

Also, one having a low generation probability is combined with a predetermined code (ZRL code) to enable all possible patterns to be expressed by finite number of codes.

In the JPEG method, the above-described processing is performed with respect to each block to complete coding of one still multi-color image.

Thereafter, an addition circuit 211 adds the above-mentioned marker codes or the like to each of the groups of data encoded as described above to obtain JPEG data as shown in FIG. 2.

Decoding ALGOL will be described.

Basically, decoding ALGOL is the reverse of the coding algorithm. Input encoded data is decoded by a decoder 212 by using a Huffman table received together with this data. The DC component of one block is added to the DC component of the preceding block by an adder 213 to form the original DC component. Decoded frequency components of AC components are converted into a two-dimensional array by an rearrangement circuit 214.

Thereafter, these frequency components are inversely quantized by an inverse quantizer 215 and are thereafter processed by inverse DCT in an inverse DCT circuit 216 to be converted into the original image data (decoded data).

In the JPEG method, the above-described processing is performed with respect to each block to complete coding of one still multi-color image.

The above-described ALGOL is a basic processing in the JPEG method. Extended systems incorporating various kinds of hierarchical coding in this are accepted in the JPEG method. If hierarchical coding is performed, the kind of hierarchical coding is indicated by the above-mentioned SOF code.

MPEG Data

MPEG data in various kinds of data transmitted in the above-described network will next be described.

MPEG data is obtained by the MPEG method that is an international standard method for encoding moving images at a high efficiency. The MPEG method basically utilizes frequency characteristics of the data and human visual characteristics, as in the case of the JPEG method. However, it also utilizes a redundancy in the time-base direction peculiar to moving images to further improve the encoding efficiency.

The MPEG method includes MPEG1 having a transfer rate set to 1.5 Mbps at the maximum for digital storage media, and MPEG2 intended for use in all transmission systems such as bidirectional digital multimedia apparatuses, digital video tape recorders, advanced television system, and optical fiber networks. However, basic algorithms for them are substantially equal to each other. Therefore, the data structure and encoding and decoding ALGOL will be described mainly with respect to MPEG1.

With respect to MPEG2, a usable coding method is prescribed by a plurality of profiles (a simple profile, a main profile, a scalable profile, a spatial scalable profile and a high profile). However, the typical main profile is substantially the same as MPEG1.

The principle of a high-efficiency coding method based on the MPEG method will now be described.

In this high-efficiency coding method, a difference between frames is taken to reduce a redundancy in the time-base direction, a difference data thereby obtained is processed by DCT and variable length coding to reduce a redundancy in the spatial direction, thereby achieving a high-efficiency coding as a whole.

With respect to the redundancy in the time-base direction, a high correlation between successive frames in the case of a moving picture may be considered and a difference between a frame to be encoded and a frame preceding or subsequent with respect to time may be taken to reduce the redundancy.

Figure 5:
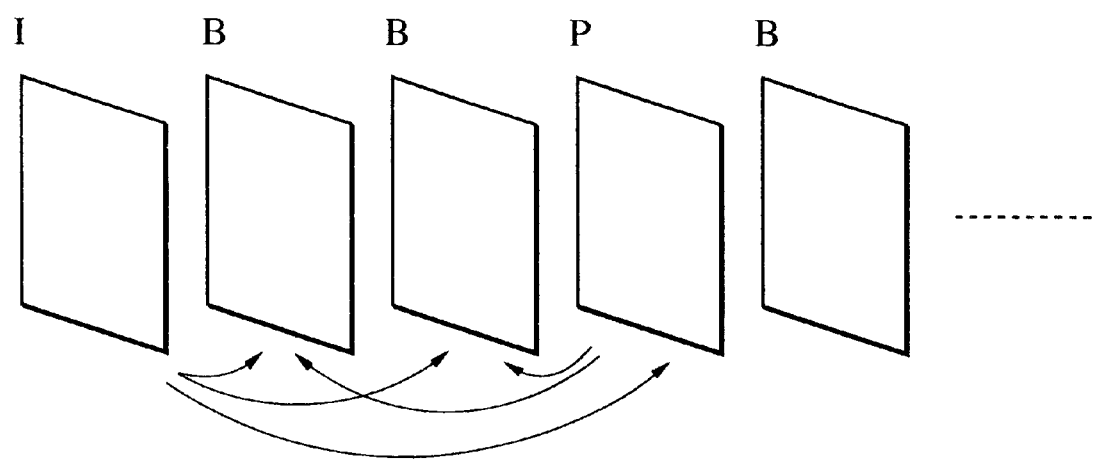
FIG. 5 is a diagram of the image structure in accordance with the MPEG method.

As shown in FIG. 5, the MPEG method uses intra-coded image (I-picture) obtained in a coding mode of encoding effected mainly within a frame, a forward prediction encoded image (P-picture) obtained by encoding the difference from the frame preceding with respect to time, and a bidirectional prediction encoded image (B-picture) obtained by encoding a difference value of a least amount of data in the value of difference from the frame preceding or subsequent with respect to time and the value of difference from a frame interpolated between the preceding and subsequent frames. Frames obtained in these coding modes are combined in a predetermined order.

According to the MPEG method, a combination is recommended in which one I-picture, four P-pictures and ten B-pictures, described above, form one unit (group of pictures (GOP)), and the I-picture is provided at the top and two B-pictures and two P-pictures are alternately arranged. The I-picture is placed in a certain cycle to enable special reproduction such as reverse reproduction, and a partial reproduction with this GOP unit as well as to prevent error propagation.

If a new object appears in one frame, the difference from the time subsequent frame may be smaller than the difference from the preceding frame.

In the MPEG method, therefore, bidirectional prediction coding such as that described above is performed to achieve compression at a higher efficiency.

According to the MPEG method, movement compensation is also performed.

That is, predetermined block units (macro blocks) are formed in which four 8×8 pixel blocks are combined with respect to brightness data and two 8×8 pixel blocks are combined with respect to color-difference data, and a difference between a macro block in one frame and macro blocks defined in the vicinity of a corresponding block in the preceding or subsequent frame is taken. A macro block of a minimum difference is searched for to detect a movement vector. This movement vector is encoded as data.

At the time of decoding, corresponding macro block data of the preceding or subsequent frame is extracted by using this movement vector, and the encoded data is decoded by movement compensation using this extracted data.

In the process of the above-described movement compensation, with respect to a preceding frame obtained by temporarily encoding a frame time-preceding one frame to be encoded and by thereafter decoding the preceding frame, macro blocks in this frame and the frame to be encoded are used for compensation.

In MPEG1, movement compensation is performed between frames. In contrast, in MPEG2, movement compensation is performed between fields.

Difference data and movement vectors obtained by the above-described movement compensation are further encoded at a high efficiency by DCT and Huffman coding such as those described above.

The data structure of this MPEG method will be described.

Figure 6:
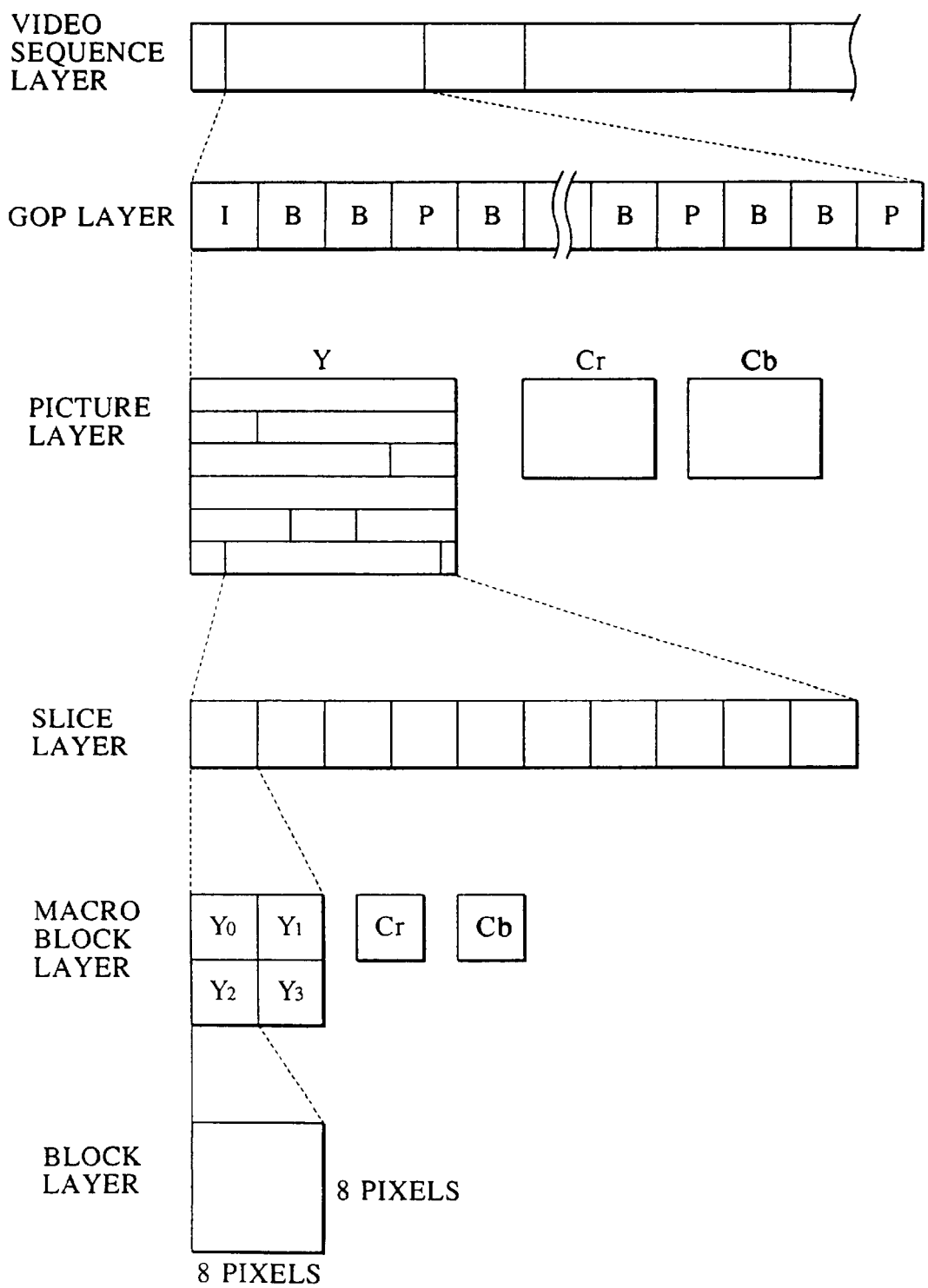
FIG. 6 is a diagram of the data structure in accordance with the MPEG method.

The data structure of this method is a hierarchical structure consisting of, as shown in FIG. 6, a video sequence layer, a GOP layer, a picture layer, a slice layer, a macro block layer, and a block layer.

These layers will be described in the order from the lowermost one at the bottom of FIG. 6.

The block layer is constituted by 8×8 pixels with respect to each of brightness data and color-difference data, as in the case of the above-described JPEG method, and DCT is performed with respect to this unit.

The macro block layer is formed in such a manner that four 8×8 pixels described above are combined with respect to brightness data, one block of each color difference data is provided, and a macro block header is added. In the MPEG method, this macro block is used as a unit of movement compensation and coding described below.

The macro block header includes data of movement compensation in the macro block unit quantization steps, and data indicating whether each of six DCT blocks (Y0, Y1, Y2, Y3, Cr, Cb) in each macro block has any data.

The slice layer is constituted by a sequence of at least one macro block in the image scanning order and a slice header. Quantization steps with respect to the sequence of macro blocks in one slice layer can be fixed.

The slice header has data on quantization steps in each slice layer, and fixes quantization steps in the slice layer if each macro block has no peculiar quantization step.

The head macro block resets the difference value of the DC component.

In the picture layer, a plurality of the above-described slice layers are combined with respect to one-frame unit. The picture layer is constituted by a header having a picture start code or the like, and one or more slice layer following the header.

This header includes a code designating an image coding mode and a code designating the accuracy of movement detection (pixel unit or half-pixel unit).

The GOP layer is constituted by a header having a group start code and a time code designating time from the start of a sequence, and a plurality of I-frames, B-frames and P-frames following the header.

The video sequence layer starts from a sequence start code and ends at a sequence end code. Control data necessary for decoding, including data on the image size, the aspect ratio and the like, and a plurality of GOPs uniform in image size and the like.

The MPEG method having this data structure has a bit stream prescribed in accordance with its standard.

Basic coding and decoding units capable of processing the above-described MPEG data will next be described with reference to FIGS. 7 and 8.

Figure 7:
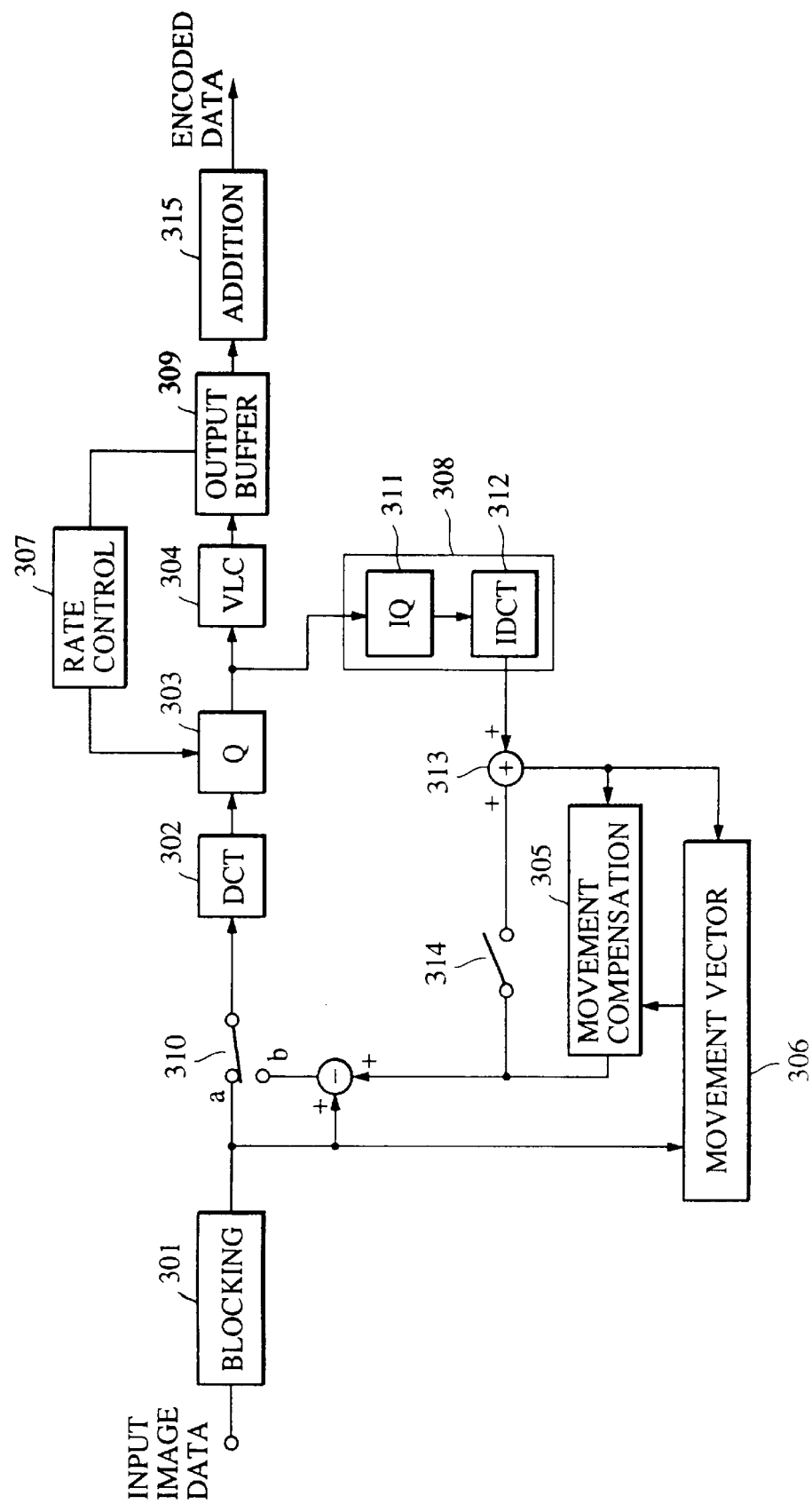
FIG. 7 is a diagram of a coder in accordance with the MPEG method.
Figure 8:
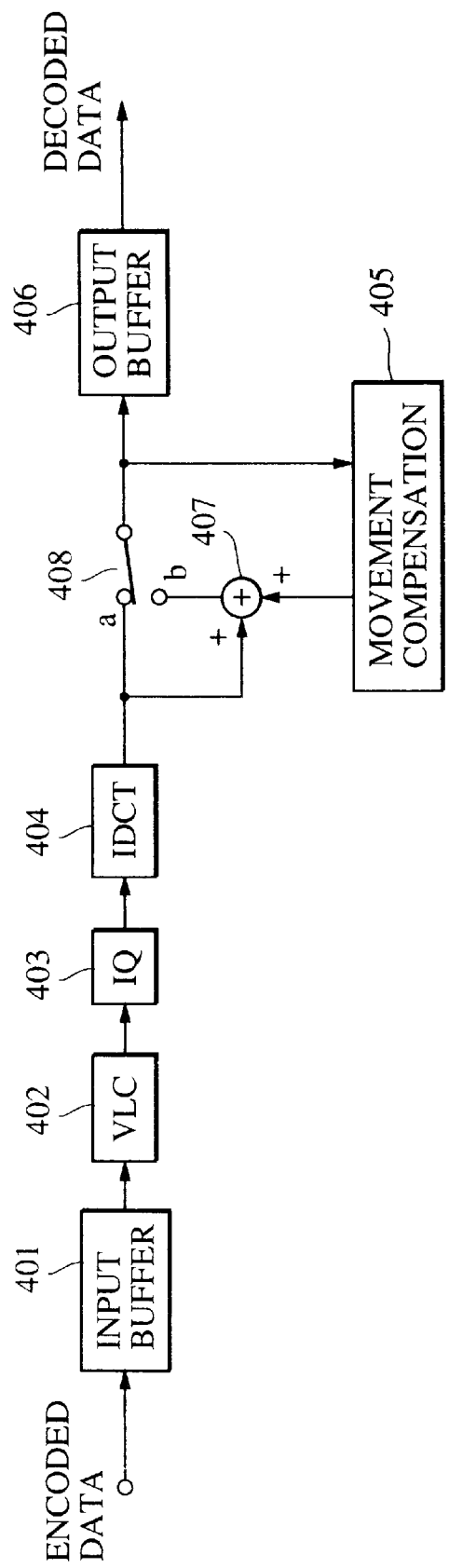
FIG. 8 is a diagram of a decoder in accordance with the MPEG method.

As shown in FIG. 7, the encoding unit is mainly formed by a blocking circuit 301, a DCT circuit 302, a quantizer 303, a variable length coder (VLC) 304, a movement compensation circuit 305, a movement vector detector 306, a rate control circuit 307, a local decoder 308, and an output buffer 309.

Figure 9:
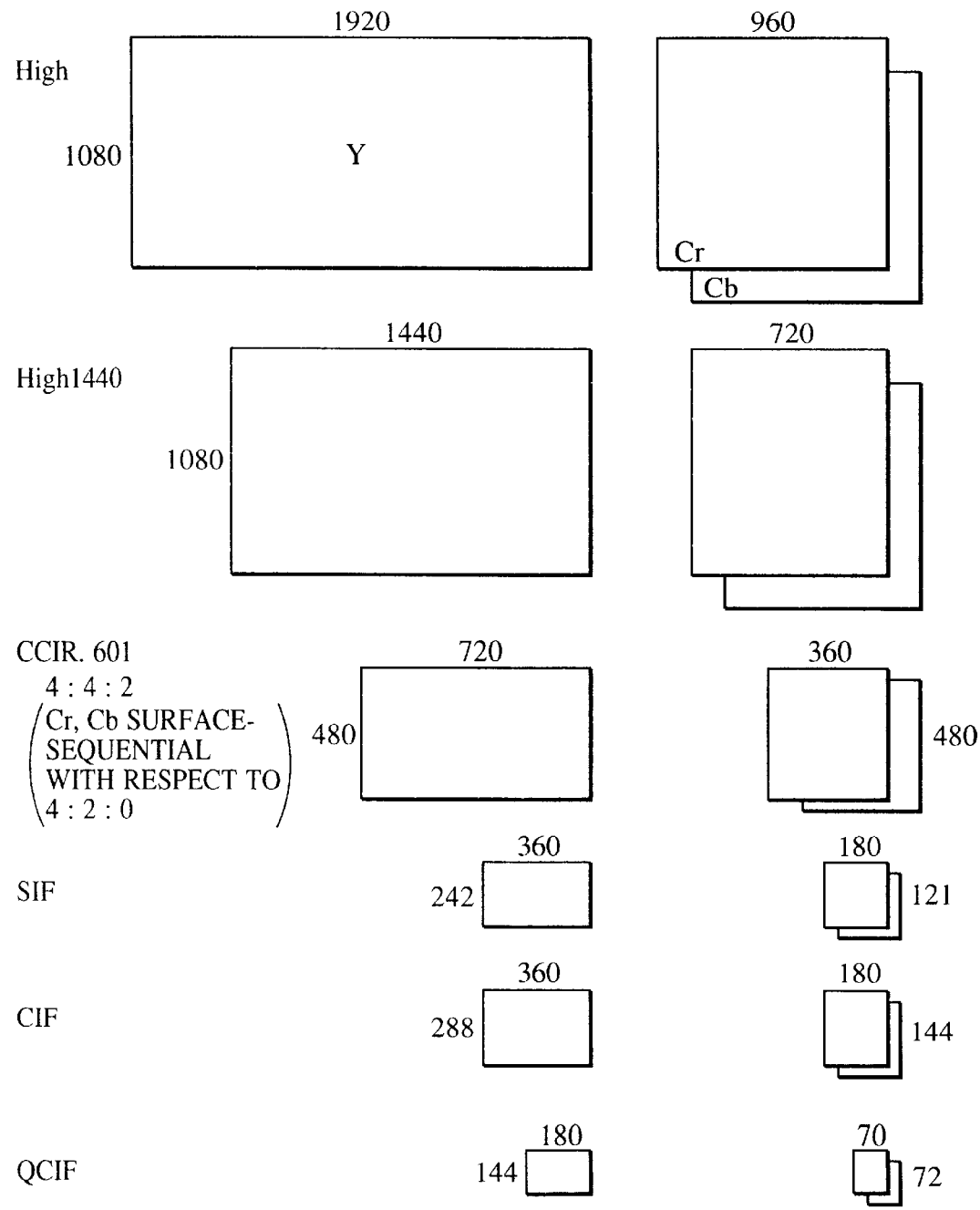
FIG. 9 is a diagram of images sizes as coding objects.
Figure 10:
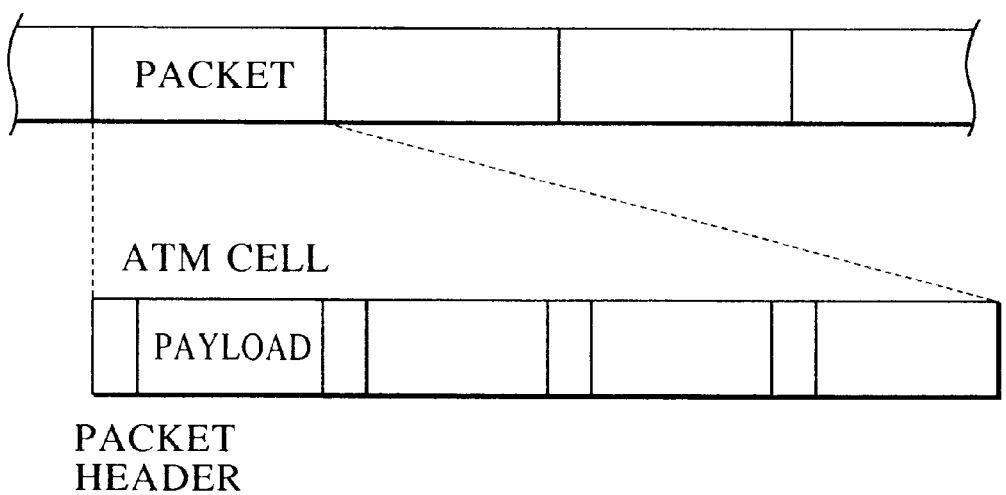
FIG. 10 is a diagram of a communication format.

As shown in FIG. 9, this coding unit has various sizes of images processable as coding objects: 1920×1080 pixel High (corresponding to the high level in MPEG2), 1440× 1080 pixel High 1440 (corresponding to the high 1440 level in MPEG2), CCIP 601 adapted images of 4:2:2 or 4:2:0 (corresponding to the main level in MPEG2), and those adapted to the formats SIF, CIF and QCIF. At the low level of MPEG1 and MPEG2, the SIF image size is to be processed.

In this coding unit, image data to be encoded is divided into 8×8 pixel blocks by the blocking circuit 301, and the divided blocks are transmitted to the DCT circuit 302 through a switch 310.

The switch 310 is changed according to whether input image data is an intra frame (I frame) or any other frame (P frame or B frame). In the case of an intra frame, connection through a contact a is formed. In other cases, connection through a contact b is formed.

Each intra frame undergoes DCT in the DCT circuit 302. DCT coefficients thereby obtained are quantized by the quantizer 303, encoded by the variable length coder 304 and temporarily stored in the buffer 309.

In the case of frames other than the intra frame, the switch forms the connection through the contact b to perform the above-described movement compensation.

Blocks 311 and 312 represent an inverse quantizer and an inverse DCT circuit, respectively, constituting the local decoder 308. The data quantized by the quantizer 303 is changed again to the original state in this local decoder 308.

A block 313 represents an adder, and a block 314 represents a switch which is closed only in the case of frames other than the intra frame. A block 316 represents a subtractor. With respect to the image data locally decoded as described above, movement vectors detected by the movement vector detection circuit 306 are referred to, and corresponding blocks in predetermined frames (the preceding frame, the subsequent frame and an interpolated frame obtained from the preceding and subsequent frames) are output from the movement compensation circuit 305.

A difference between this output from the movement compensation circuit 305 and the input image data is obtained by subtraction processing in the subtractor 316. This difference value is encoded by the above-mentioned DCT circuit 302, the quantization circuit 303 and the variable length coder (Huffman coder 304) and is thereafter stored in the above-mentioned buffer 309.

The above-mentioned Huffman encoder is basically the same as the above-described encoder in accordance with the JPEG method, but differs from the same in that only a predetermined code (escape code) is assigned to data of a low generation.

The movement vector detector 306 obtains a movement vector by comparing frame data to be coded and predetermined reference frame data. A detection output from the detector 306 is supplied to the movement compensation circuit 305 to designate a macro block that the movement compensation circuit 305 is to output.

The rate control circuit 307 performs code amount control by changing quantization steps of the quantizer 303 on the basis of the amount of occupation of encoded data in the buffer.

Various headers such as those described above are finally added to the encoded data by the addition circuit 315 to send out the data as MPEG data in accordance with the MPEG method.

On the other hand, the decoding unit performs the operation basically reverse to the above-described coding. The decoding unit is constituted by an input buffer 401, a variable length decoder (VLD) 402, an inverse quantizer (IQ) 403, an inverse DCT circuit (IDCT) 404, a movement compensation circuit 405, and output buffer 406 and other components.

That is, encoded data successively read out from the input buffer 401 is processed by the variable length decoder 402, the inverse quantizer 403, the inverse DCT circuit 404 to be converted into a spatial region.

A component 407 is an adder for adding a difference value from the movement compensation circuit 405 to an output from the inverse DCT circuit 404. A component 408 is a switch for selecting the output from the inverse DCT circuit 404 or an output from the adder 407.

The switch 408 forms a connection through a contact a if it is determined on the basis of a coding discrimination code detected by a data detection circuit (not shown) that an intra frame has been input. The switch 408 forms a connection through a contact b when the input frame is not an intra frame.

Data decoded in this manner is temporarily stored in the output buffer 406, restored into the original spatial configuration, and output as one-frame image data.

ATM Format

The ATM communication format will next be described.

In this ATM communication, a bit stream is divided into a plurality of fixed-length packets each formed of a plurality of 1 (e.g., four) ATM cells.

Each ATM cell is formed of a packet header and data pay load. Ordinarily, 5 bytes are used for the header while 48 bytes are used for data.

In this ATM communication, data can be transmitted independently of (asynchronous with) the bit rate of the network, and the transmission rate can be arbitrarily set by selecting the number of transmitted cells per unit time. Therefore, the ATM communication is suitable for a transmission system in which various kinds of data are mixedly transmitted.

Personal Computer

The configuration of the personal computer shown in FIG. 1 will next be described.

Figure 11A:
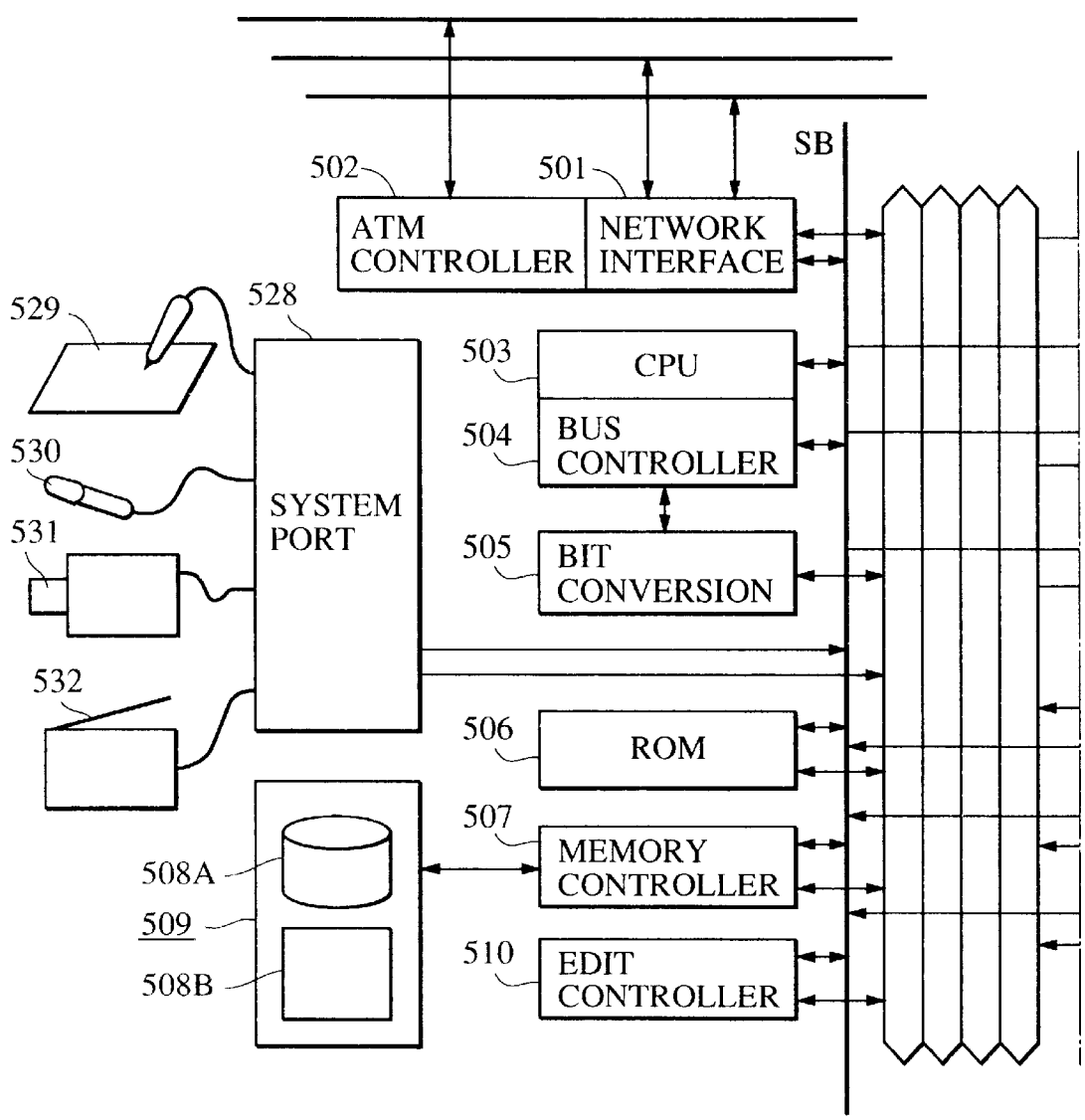
FIG. 11 is a diagram of the configuration of a personal computer.
Figures 11, 11B:
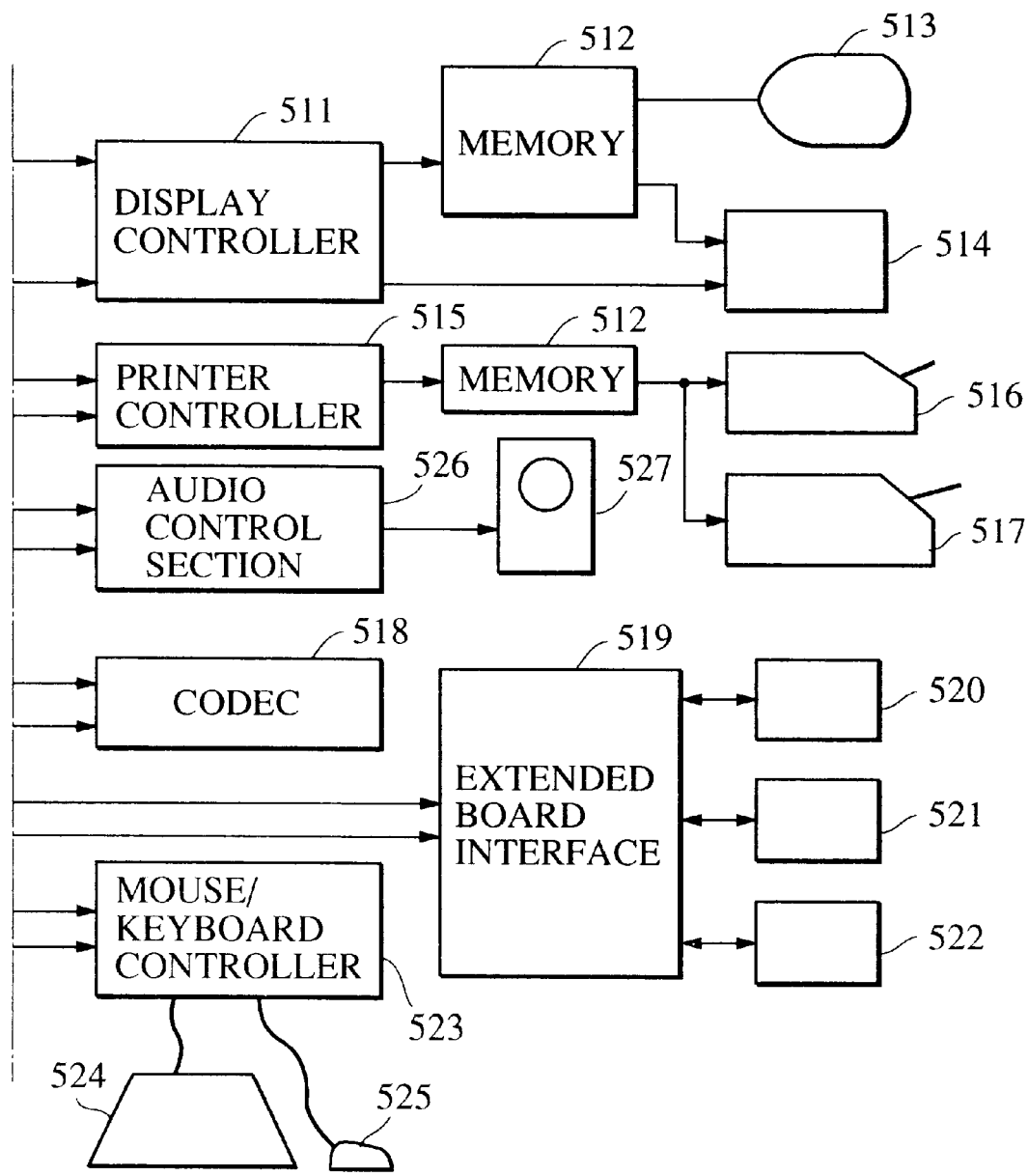

FIG. 11 shows the configuration of the personal computer of this embodiment. The personal computer has a multi-bus system in which an optimal data bus is selectively used according to the amount of data to be transmitted and a necessary transfer rate for processing, because it processes data in accordance with the above-described various kinds of methods and has various functions. In this embodiment, the multi-bus system includes a 16-bit data bus D1, a 32-bit data but D2, a 64-bit data bus D3, and two extension buses which are a 128-bit data bus D4 and a system bus SB.

This personal computer also has a later-mentioned extension board interface for function extension. Various extension boards are connected to this interface to provide extended functions.

Details of the personal computer will be described.

The personal computer exchanges various kinds of data with the above-mentioned transmission channels through a network interface 501 and an ATM controller 502 provided in the network interface 501.

The ATM controller 502 not only functions as an ATM switch but also performs various communication controls such as jam control in the above-described ATM-LAN.

A block 502 in FIG. 11 represents a central processing unit (CPU) for performing overall control of the personal computer. The CPU 502 has, as a sub CPU, a bus controller 504 constituting the above-described multi-bus system, and also has a bit converter 505.

In this multi-bus system, one of the above-mentioned data buses is selectively used according to the amount of data to be processed and a necessary processing speed to process the data at the desired rate.

A block 506 represents a ROM, and a block 507 represents a memory controller. The memory controller 507 exchanges data with an external storage unit 509 having a hard disk unit 508A and a CD ROM 508B.

A block 510 represents an edit controller which performs phase management of data and adjustment of brightness and color components between the plurality of channels during image edition or the like.

A block 511 represents a display controller. Image data output from the display controller 511 is displayed by a cathode ray tube (CRT) display 513 or a ferroelectric liquid crystal (FCL) display 514 through a memory 512.

The display controller 511 suitably processes data according to the kind of display device.

A block 515 represents a printer controller which selectively uses a thermal transfer printer 516 and a hybrid printer 517 having different printer sections using a bubble jet system and a thermal transfer system according to image data to be printed.

The memory 512 may be used in common for the display and the printer.

A block 518 represents a codec for encoding and decoding data. In this embodiment, the codec is designed in accordance with the above-described JPEG and MPEG methods.

A block 518 represents an extension board interface through which various extension boards 520, 521, and 522 for encipherment, accounting management and the like of extended functions of the personal computer.

A block 523 represents a mouse/keyboard controller through which a keyboard 524 and a mouse 525 are connected.

A block 526 represents an audio control section to which a speaker 527 is connected.

On the other hand, a handwriting input device 529, a microphone 530, a video camera 231 and a scanner 532 are connected to this personal computer through a system port 528.

The thus-constructed personal computer has the above-described multi-bus system formed of multiple data buses D1, D2, D3, and D4, bus controller 504 and bit converter 505 and selectively uses an optimal one of the data bus according to the amount of data, necessary transfer and processing rates and other factors of processing.

Also, extended functions can be provided by using extension boards connected to the extension board interface 519. For example, a board for performing encoding and decoding suitable for the above-mentioned profiles may be connected as an extension board for the codec to extend the processing operation of the same.

Codec

The configuration of the codec of the personal computer shown in FIG. 11 will next be described.

Figure 12:
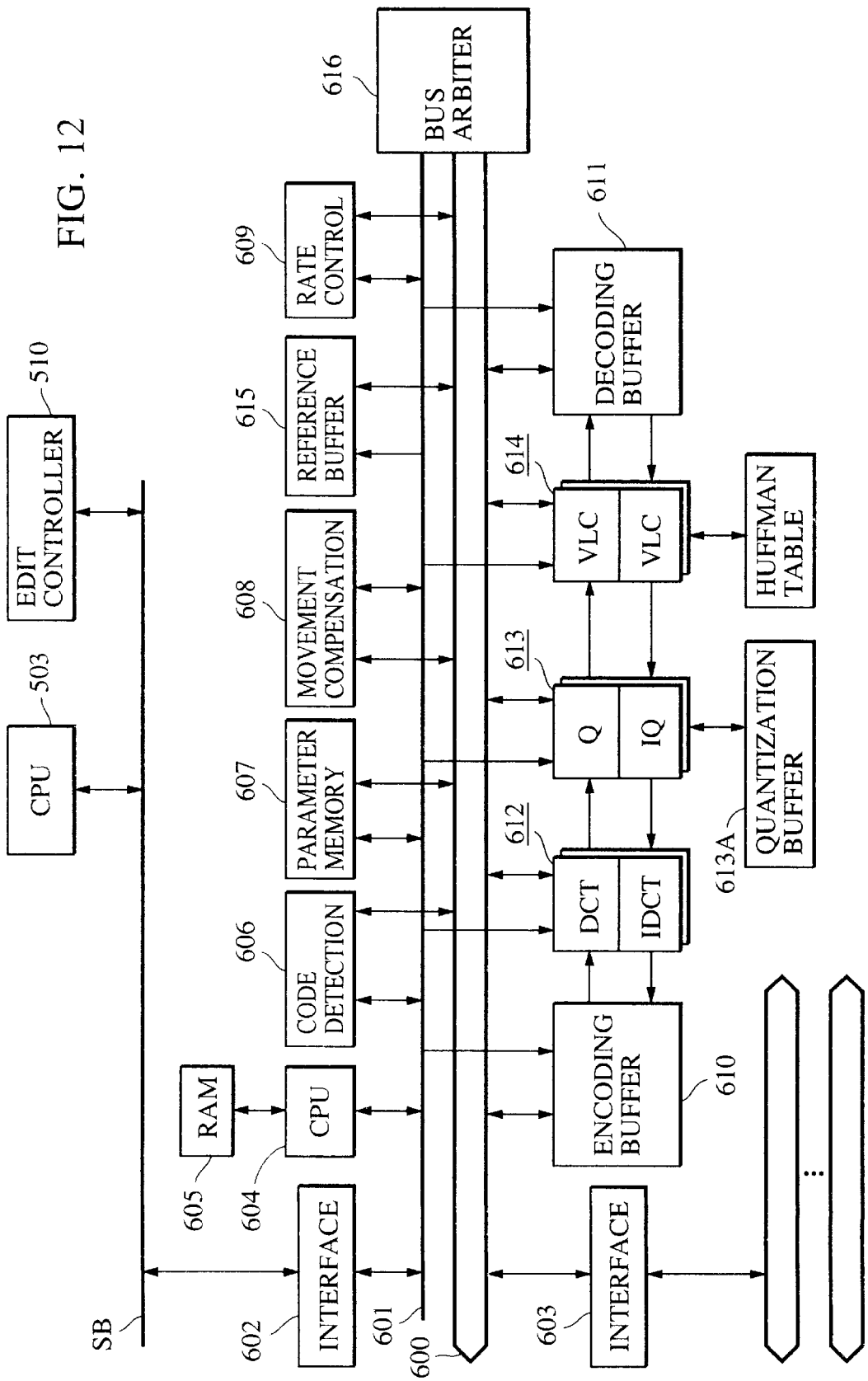
FIG. 12 is a diagram of the codec shown in FIG. 11.

As shown in FIG. 12, the codec is formed by various functional blocks connected to a data bus 600 and a system bus 601. The codec exchanges data and commands with the CPU 503 and the edit controller 510 through the system bus SB and the data bus of the main section of the personal computer and through its microcomputer interface 602 and its data interface 603.

A block 604 represents a CPU for performing overall control of the codec. The CPU 604 conducts coding and decoding on the basis of a program previously stored in a random access memory (RAM) 605.

A block 606 represents a code detector which detects control codes, i.e., start codes (time codes), headers and the like, and encoded data in input encoded data.

Each code detected by the code detector 606 is transmitted to the CPU 604 through the data or system bus for operation control and is also stored in a parameter memory 607 to be transmitted to predetermined blocks.

A block 608 represents a movement prediction unit, a block 609 a rate control unit, a block 610 an encoding buffer unit, and a block 611 a decoding buffer unit.

Input image data transmitted through the encoding buffer unit 610 or movement vector data and difference values (encoded data) transmitted from the movement compensation unit 608 are successively processed by a transform unit 612 formed of a plurality of DCT circuits and a plurality of inverse DCT (IDCT) circuits, a quantization unit 613 formed of a plurality of quantization (Q) circuits and a plurality of inverse quantization (IQ) circuits, and a variable length coding unit 614 formed of a plurality of variable length coding circuits (VLC) and a plurality of variable length decoding circuits (VLD), are stored in the decoding buffer 611 and are output through the data bus and the interface 603 by a predetermined timing designated by the CPU 604.

The quantization unit 613 and the variable length coding unit 614 have a quantization table 613A and a Huffman table 614A, respectively. Various parameters such as quantization steps and Huffman codes necessary for processing in these units are transferred from the parameter memory 607 as desired.

On the other hand, encoded data (data to be decoded) transmitted through the decoding buffer 611 is successively processed by the transform unit 612, the quantization unit 613 and the variable length coding unit 614, stored in the coding buffer 610 functioning as an output buffer, and output through the data bus and the interface by a timing designated by the CPU 604.

The movement compensation unit 608 makes movement compensation of the P and B frames at the time of coding and decoding by using a reference buffer 615. In this embodiment, the movement compensation unit 608 is also used for the operation of obtaining DC components in JPEG coding.

A block 616 represents a bus arbiter which arbitrates between the data buses in pipe line processing or the like.

The thus-constructed codec receives instructions from the CPU 503 in the main section of the personal computer and operate predetermined ones of the above-described units by the CPU 604 to perform coding or decoding.

In this codec, data transfer to the above-described units and operation control are performed by an optimal sequence according to one of various processing modes, such as a mode of simultaneously performing coding or decoding in a plurality of systems, a mode of simultaneously performing coding and decoding in parallel processing manner, and a mode of performing each of various kinds of processing such as communication, displaying and printing in the main section of the personal computer in parallel with coding or decoding. An operation program for such a sequence is previously stored in the RAM 605.

The program stored in the RAM 605 can be updated as desired.

Edit Operation

Figure 13:
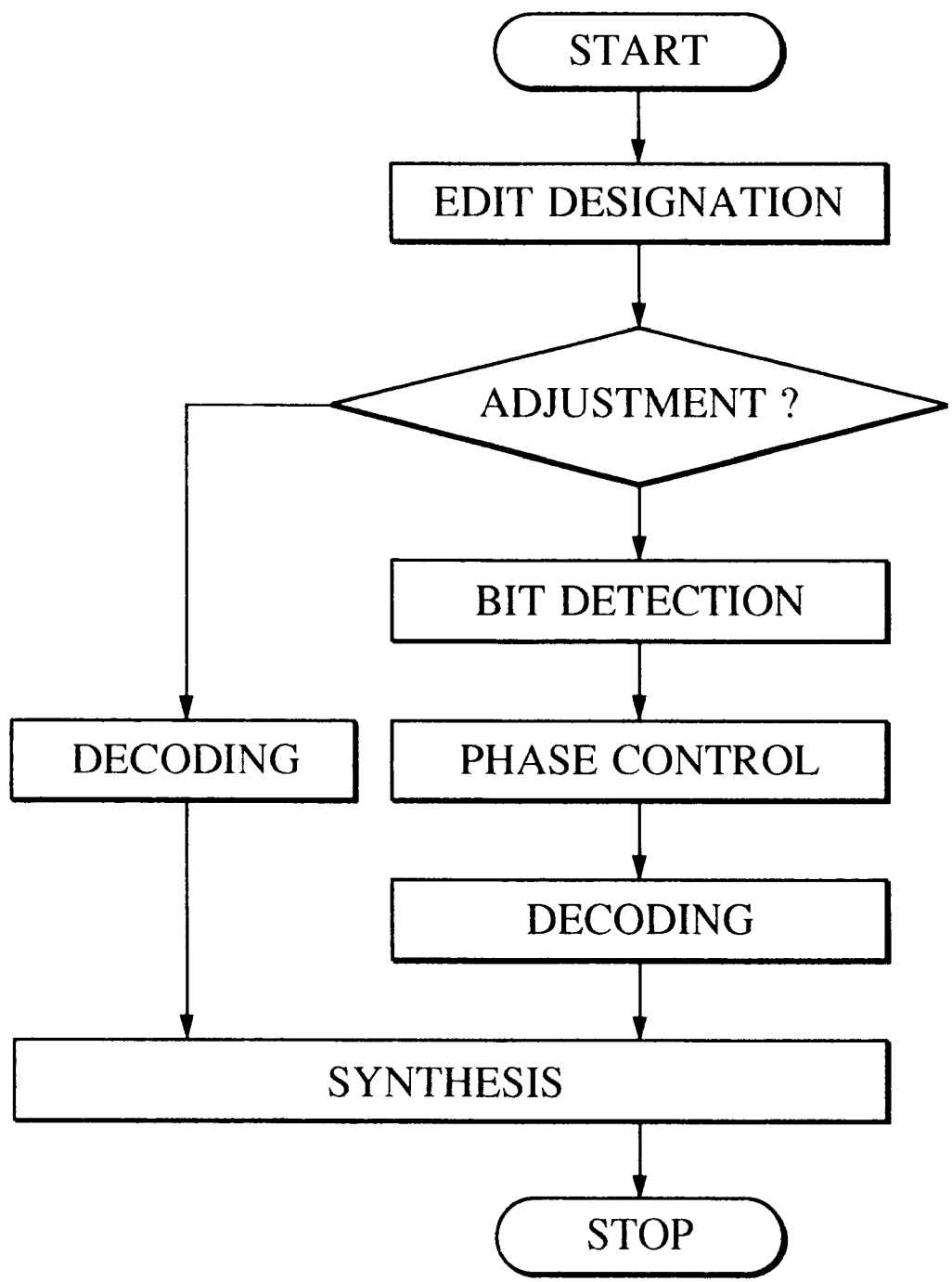
FIG. 13 is a flowchart of edit operation.

The edit operation in the above-described codec system will be described with reference to the flowchart of FIG. 13.

In this embodiment, groups of image data compressed by the above-described MPEG method in a plurality of channels (two channels) are simultaneously input and are combined to be supplied to output devices such as a monitor and a printer.

First, based on an image edit command, the CPU 503 instructs the edit controller 510 to perform the edit operation and also instructs the codec 518 to perform the decoding operation (Step 1).

Next, a determination is made as to whether component adjustment is to be made (Step 2). When component adjustment is not performed, data in each channel is decoded as described above (Step 3). Data in each channel is thereby formed into one-frame decoded data (Step 4) and the process is terminated (Step 5).

On the other hand, bit detection is first made (Step 6) and timing control is performed according to various control codes detected including a start code (Step 7).

For example, if MPEG data in two channels is combined and edited, the edit controller 503 receives a start code of I frame of first image data decoded and a start code of I frame of second image data decoded, and controls the timing of output of data from the decoding buffer 611 on the basis of the phase difference (time difference) between these groups of data.

That is, if the start codes of the two groups of data do not coincide with each other, that is, if, as shown in FIG. 14, the second image data is P or B frame when the first image data is I frame, each group of data is decoded in such a non-coincident state, and timing control of the output from the output buffer (coding buffer 610) is performed with respect to the preceding image data (first image data in this case) so that the images are in phase with each other.

If, as shown in FIG. 15, the start codes of the two groups of data coincide with each other, the timing of output from the buffer in the above-described input circuit 2 is controlled to cause a phase shift between the groups of image data. In this shifted state, each group of data is decoded. Also, timing control is again performed by delaying the output timing of the output buffer with respect to the preceding image data so that the images are in phase with each other.

Next, the groups of data in the plurality of channels, thus timing-controlled, are decoded (Step 8) and color component adjustment is performed with respect to hue, chromaticity and the like on the basis of the result of this decoding (Step 9).

That is, in this embodiment, only DC components in brightness components corresponding to one frame in data in one of the two channels are extracted to detect an average brightness of each frame. An average brightness of the corresponding frame in the other channel is thereby determined. On the basis of this, an inverse quantization table at the time of decoding is determined for brightness adjustment.

Similarly, with respect to color components, only DC components in DCT coefficients of color components corresponding to one frame in data in one of the two channels are extracted to detect an average hue and an average chromaticity of each frame, thereby determining. average color components or an average ratio of color difference components Cr and Cb of the corresponding frame in the other channel. Based on this, color component adjustment is performed by adjusting offsets of the DCT component values or by determining an inverse quantization table at the time of decoding.

The data in the channels component-adjusted in this manner are combined with respect to each frame (Step 4) to complete edit and decoding (Step 5), and units of the combined data corresponding to frames are thereafter output one after another.

In the edit operation of this embodiment, as described above, the phases of groups of image data are shifted so that I frames do not coincide with each other when the data is decoded, thereby regulating the power consumption.

When, for example, the data is displayed on the monitor, I frames are shifted so as to coincide with each other, thereby equalizing the image qualities of the groups of image data. The total image quality of the resulting synthesized image is thereby improved.

According to the present invention, as is apparent from the foregoing, naturalness of a synthesized image formed by combining groups of data supplied through a plurality of channels can be improved because adjustment of brightness and color components of the data is performed when the data in the plurality of channels are performed simultaneously.

In the above-described embodiment, each of the brightness and the color difference is adjusted only with respect to DC components. Alternatively, the brightness and the color difference may be adjusted with respect to all frequency components or particular frequency components thereof.

While the present invention has been described with respect to what is presently considered to be the preferred embodiment, it is to be understood that the invention is not limited to the disclosed embodiment. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image reproducing apparatus for reproducing an image represented by at least first and second groups of encoded image data available at first and second channels respectively, said image reproducing apparatus comprising:
   detection means for detecting a signal value difference between data in the first group and data in the second group, the signal value difference being a DC component difference between respective DC components of the first and second groups; and
   decode means for decoding the first and second groups of encoded image data to provide decoded image data, said decode means including regulating means for regulating signal values of the decoded image data and control means for controlling said regulating means on the basis of the detected signal value difference to compensate for a difference between data available from the first and second channels.

2. An apparatus according to claim 1, wherein the signal values are controlled on the basis of plural signal value differences between the data of the groups of image data.

3. An apparatus according to claim 2, wherein each signal value difference comprises a difference between signal values of discrete cosine transform coefficients.

4. An apparatus according to claim 1 or 2, wherein one said signal value is a signal value of a brightness component.

5. An apparatus according to claim 1 or 2, wherein one said signal value is a signal value of a color component.

6. An apparatus according to claim 1, wherein said signal value is a ratio of signal values of a plurality of color components.

7. An image reproducing method for reproducing an image represented by at least first and second groups of encoded image data available at first and second channels respectively, said image reproducing method comprising the steps of:
   detecting a signal value difference between data in the first group and data in the second group, the signal value difference being a DC component difference between respective DC components of the first and second groups; and
   decoding the first and second groups of encoded image data to provide decoded image data, said decoding step including a step of regulating signal values of the decoded image data and a step of controlling said regulating step on the basis of the detected signal value difference to compensate for a difference between data available from the first and second channels.

8. A computer-readable memory medium storing program codes for causing execution of an image reproducing method for reproducing an image represented by at least first and second groups of encoded image data available at first and second channels respectively, said image reproducing method comprising the steps of:
   detecting a signal value difference between data in the first group and data in the second group, the signal value difference being a DC component difference between respective DC components of the first and second groups; and
   decoding the first and second groups of encoded image data to provide decoded image data, said decoding step including a step of regulating signal values of the decoded image data and a step of controlling said regulating step on the basis of the detected signal value difference to compensate for a difference between data available from the first and second channels.

* * * * *